United States Patent [19]

Kiuchi et al.

[11] Patent Number: 4,577,193

[45] Date of Patent: Mar. 18, 1986

[54] COHERENT SIDELOBE CANCELLER FOR RADAR

[75] Inventors: Eiichi Kiuchi; Hiroshi Sawanaka; Yuichi Tomita, all of Tokyo, Japan

[73] Assignee: NEC Corporation, Tokyo, Japan

[21] Appl. No.: 663,464

[22] Filed: Oct. 18, 1984

[30] Foreign Application Priority Data

Oct. 19, 1983 [JP] Japan .................. 58-195743

[51] Int. Cl.⁴ ................... G01S 3/16; G01S 3/28
[52] U.S. Cl. ......................... 343/380; 343/383
[58] Field of Search ............... 343/382, 380, 383

[56] References Cited

U.S. PATENT DOCUMENTS 4,313,116  1/1982  Powell et al. ............. 343/383

Primary Examiner—Theodore M. Blum
Attorney, Agent, or Firm—Schwartz, Jeffery, Schwaab, Mack, Blumenthal & Evans

[57] ABSTRACT

A coherent sidelobe canceller configured as a linear array antenna system having a digital open-loop configuration comprising signal receiver means having (N+1) channels (N is an integer more than one) comprising a main antenna, N auxiliary antennas, and (N+1) signal receiver circuits connected to (N+1) antennas including said main antenna with a one-to-one relationship, to produce radar video signals; analog-to-digital converter means, each channel being connected to corresponding one of said signal receiving means to convert said radar video signals to digital signals; memory means connected to said analog-to-digital converting means to store said digital signals therein; weighting coefficient calculating means connected to all (N+1) channels of said analog-to-digital converting means to perform statistical calculation processing with respect to time series digital signals, thus calculating weighting coefficients based on statistical characteristic of an input signal; multiplier means having (N+1) channels, each channel being connected to corresponding one of said memory means and said weighting coefficient calculating means to start readout operation from said memory means upon completion of the weighting coefficient calculation, thereby to multiply a weighting coefficient, calculated by said weight coefficient calculation circuit, by digital signals thus read and; adder means for summing output signals from said multiplier means, thereby enabling to suppress interference signal based on real time processing.

2 Claims, 2 Drawing Figures

COHERENT SIDELOBE CANCELLER FOR RADAR

BACKGROUND OF THE INVENTION

The present invention relates to a coherent sidelobe canceller for eliminating interference signals in a radar system, and more particularly to a coherent sidelobe canceller having digital open-loop configuration for sidelobe cancellation computational processing.

Sidelobe cancellers for radar consist of a main, high gain antenna and a plurality of auxiliary antennas each having a gain corresponding to a sidelobe gain of the main antenna and a beam width relatively broader than that of the main antenna. In the sidelobe canceller, signals received from the main- and auxiliary- antennas are linearly coupled by making use of correlation between the main- and auxiliary- antennas in regard to interference signals coming from sidelobe regions of the main antenna to form a certain pattern in the arrival direction of the interference signals, thus suppressing interference waves.

Referring to FIG. 1, there is shown a typical arrangement of a conventional sidelobe canceller. The sidelobe canceller is configured, as a linear array antenna system having $(N+1)$ channels $CH_O$ to $CH_N$, comprising a main antenna 100-0, a plurality of auxiliary antennas 100-1 to 100-N, receiver circuits 110-0 to 110-N for receiving signals coming from the main- and auxiliary- antennas, resepctively, to produce radar video signals, a weight computing circuit 120 which effects weighting operation in response to $(N+1)$ radar video signals to produce desired weights, multipliers 130-0 to 130-N for multipling radar video signals from receivers 110-0 to 110-N by weight outputs from the weight computing circuit 120, and an adder 140 for summing respective outputs from the multipliers to produce a summed signal on an output terminal 150.

The function of such a coherent sidelobe canceller will be described using a mathematical expression. Assuming now that an input signal of the main antenna is denoted by $X_O(t)$, the number of the auxiliary antennas N, and input signal of the i-th auxiliary antenna $X_i(t)$, and a weighting coefficient for each i-th input terminal $W_i$, an output signal $y(t)$ is expressed as $$y(t) = \sum_{i=0}^{N} w_i X_i(t). \quad (1)$$

It has been known that a value of the optimum weighting coefficient for maximizing the suppression of the interference signals coming from sidelobe regions of the main antenna is theoretically obtained by $$W = \mu \phi^{-1} S^* \quad (2)$$

where the asterisk (*) denotes the complex conjugate and this notion is applicable to other equations described below in the same sense, W is a weighting coefficient vector, $\mu$ is a proportional constant, $\phi^{-1}$ is an inverse matrix of covariance matrix $\phi$ of input signals, and S is called a steering vector and in the case of the sidelobe canceller, is usually given by the following column vector:

$$S^* = \begin{pmatrix} 1 \\ 0 \\ \cdot \\ \cdot \\ 0 \end{pmatrix}. \quad (3)$$

Further, the covariance matrix is expressed by, with E being referred to as an expectation value operator, $$\phi = \begin{pmatrix} E[X_0^*(t)X_0(t)] \ldots E[X_N^*(t)N_0(t)] \\ E[X_0^*(t)X_N(t)] \ldots E[X_N^*(t)X_N(t)] \end{pmatrix}. \quad (4)$$

Thus, by obtaining a covariance $E\,[X_l^*(t)X_m(t)]$ ($l, m = 0, 1 \ldots, N$) with respect to an input time series signal $X_i(t)$ ($i = 0, 1 \ldots, N$) from $N+1$ antennas including the main antenna, the interference signals can be ideally suppressed. However, the following problems arise when the weighting coefficient is obtained on the basis of the theoretical equation (1) in a radar.

(1) Since the equation (2) is obtained by performing complex operation, the operational time required for obtaining the inverse matrix $\phi^{-1}$ exponentially increases as N increases.

(2) It is required to perform the expectation value operation over a sufficiently long time in a time range within which the characteristics of interference signals do not vary, thus ensuring a predetermined statistical operational processing accuracy. However, if the operational processing for the expectation value is effected for long time, the delay in processing increases, resulting in degradation of response speed with respect to the interference.

For this reason, in the prior art, a technique for calculating the weighting coefficient due to repetitive operation in an asymptotic manner has been widely used. This technique is expressed by, with the repetitive number being as a subscript, $$W(k) = W(k-1) + f[X(k), y(k-1)] \quad (5)$$

where $X(k)$ denotes an input signal vector, $y(k)$ an output signal processed by the coherent sidelobe canceller, and f a function, generally determined by $X(k)$ and $y(k)$. Equation (5) means that the weighting coefficient vector is updated so as to more efficiently suppress interferece signals with respect to the input signal vector $X(k)$ at the K-th trial of the present timing by using a weighting coeffecent vector $W(k-1)$ at the $(k-1)$-th trial and $y(k-1)$ representative of uncancelled interference signal to which the coherent sidelobe cancellation processing is implemented with the weighting coefficient vector $W(k-1)$. The operation for weighting the coefficient vector in equation (5) is generally advantageous but the following problems still remain.

(1) Because of repetitive operations, a time for convergence is required, imposing a limitation on the response speed with respect to interferences, thus giving rise to a large impact in practice in a radar requiring instantaneous response.

(2) In a radar, there generally exist reflected signals (which will be called "clutter" hereinafter) from mountains, buildings, rainy clouds, the sea level etc., as well as interference signals. During repetitive operation process, if clutter signal components are contained in an input signal, they will vary as time elapses to make the operation based on equation (4) invalid, thus failing to obtain a desired interference suppression capability.

Further knowledge in connection with the above technique for obtaining weight coefficients due to repetitive operation is given by e.g. IEEE Trans. Antennas and Propag. AP-24: 585–598 (1976) pp 136–149. This sidelobe cancellation is based on closed-loop processing similar to the above system of FIG. 1. This system carries out weighting coefficient calculation by repetitive operational processing based on a feedback operation. Accordingly, in the application of a radar where instantaneous response is required, there is a tendency that the converging time increases. Further, since this system is unable to reject or eliminate clutter singals, the clutter signal is included in the weighting coefficient computational processing in the vicinity of the clutter region, resulting in difficulty in suppressing the interference signal. Furthermore, in the event that there occurs interference in a clutter region, the clutter signal is included in the feedback loop, thus making it difficult to suppress interference signals.

On the other hand, another prior art interference canceller is disclosed in IEE PROC. Vol. 130. Pts. F and H. No. 1. February 1983. This system is based on an open-loop control. Viz., the latter system employs a weighting coefficient calculation due to digital open-loop processing, requiring about 10 to 100 samples for maintaining a desired calculation accuracy. This results in a delay in processing to cause a time difference between the received signal and the weighting coefficient, thus degrading interference signal suppressing performance. Namely, there is no mechanism for delaying the received signal by a processing delay due to weighting coefficient computational processing. Further, since similar to the former close-loop system, there is no mechanism for rejecting clutter signals, the clutter signal is included, in the weighting coefficient computational processing in the vicinity of the clutter region, thus making it difficult to suppress interference singals. Furthermore, an interference signal is likely to be superposed on a clutter signal in the clutter region, leading to difficulty in suppressing the interference signal.

SUMMARY OF THE INVENTION

With the above in view, an object of the present invention is to provide a coherent sidelobe canceller capable of completely solving the drawbacks stated above.

Another object of the present invention is to provide a coherent sidelobe canceller which detects a clutter region to sample only signals except for those in clutter regions thereby to effect weighting coefficient operational processing, thus enabling suppression of interterence signals without undesired influence of the clutter.

A further object of the present invention is to provide a coherent sidelobe canceller which can delay a received signal by making use of a memory during a processing time required for weighting coefficient calculation, thereby to allow a substantial respeonse time to be zero, thus improving interference signal suppression capability.

According to the present invention, there is provided a coherent sidelobe canceller comprising means for determining from a received signal of a radar a region in which there is no clutter, means responsive to the first mentioned means to calculate a covariance matrix of the received signal of the radar on the basis of the equation (4) by making use of, among time series received signals, a signal existing in a region in which there is no clutter, means for computing a theoretically optimum weight coefficient from the calculated coveriance matrix using the equation (2), and a memory for storing the radar received signal during a time required for calculating the weight coefficient, whereby the weight coefficient calculated by the equation (2) is applied to the received signal read from the memory used for calculating the covariance of the equation (4) and real time processing is realized without response delay with respect to interferences by effecting the coherent sidelobe operational processing based on the equation (1).

BRIEF DESCRIPTION OF THE DRAWINGS

The features and advantages of a coherent sidelobe canceller according to the present invention will become apparent from the following description taken in conjunction with the accompanying drawings, in which.

DETAILED DESCRIPTION OF THE PREFERRED EMBODIMENT

Figure 1:
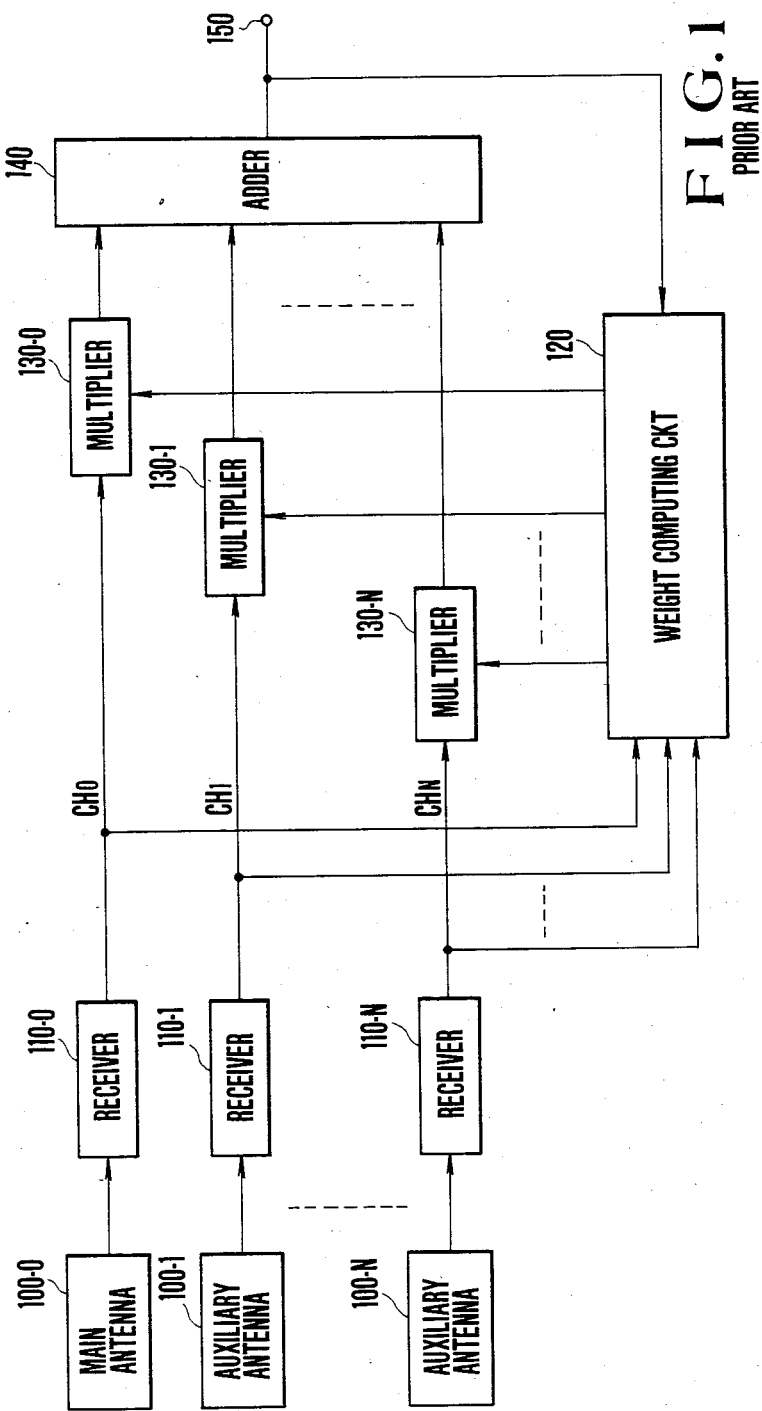
FIG. 1 is a block diagram illustrating a typical construction of a conventional coherent sidelobe canceller.
Figure 2:
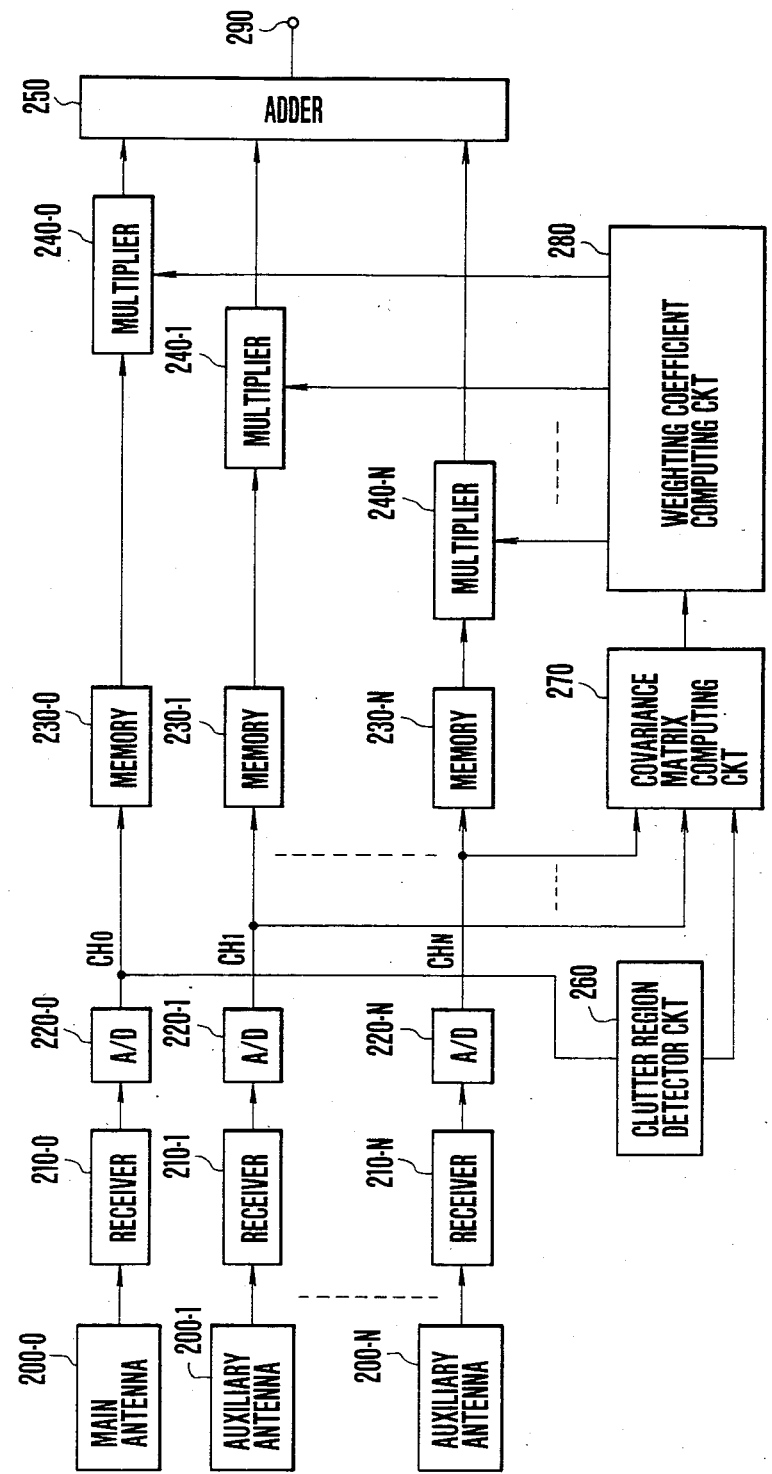
FIG. 2 is a block diagram illustrating a coherent sidelobe canceller according to an embodiment of the present invention.

The present invention will be described with reference to FIG. 2 illustrating an embodiment thereof.

As shown in FIG. 2, the coherent sidelobe canceller according to the present invention employs a digital open-loop configulation for sidelobe cancellation computational processing. This sidelobe canceller is configured as a linear array antenna system including signal receiving means having (N+1) channels (N is an integer more than one) comprising a main antenna 200, N auxiliary antennas 210-1 to 210-N, and (N+1) receiver circuits connected to (N+1) antennas with a one-to-one relationship, thereby to produce radar video signals from receiver circuits, respectively.

This sidelobe cancellation system further comprises (N+1) analogue-to-digital (A/D) convertors 220-0 to 220-N having inputs connected to outputs of the receiver circuits, respectively, to convert radar video signals to corresponding digital signals, (N+1) memories 230-0 to 230-N having inputs connected to outputs of the A/D converters, respectively, to store digital signals therein until weighting coefficient computational processing to be referred to later is completed.

This sidelobe cancellation system further comprises (N+1) multiplier 240-O to 240-N having inputs connected to the memories 230-O to 230-N a weighting coefficient computing circuit which will be describe soon, to start readout operation from memories 230-O to 230-N upon completion of the weighting coefficient calculation, thereby to multiply a weighting coefficient calculated by digital signals thus read, and a summer 250 for respective outputs from multipliers 240-O to 240-N and having an output terminal 290 from which a summed value is output.

In addition to the components stated above, the present sidelobe cancellation system is provided with weighting coefficient computational circuitry. This weighting coefficient computational circuitry receives all outputs of A/D converters 220-0 to 220-N to perform statistical calculation processing with respect to time series digital signals, thus calculating weighting coefficients based on statistical characteristic of the received signal. This circuitry comprises a clutter region detector circuit 260 having an output connected to the output of the A/D converter 220-0 (corresponding to the channel $CH_O$) to determined a clutter region in the received signal 1, a covariance matrix computing circuit 270 having inputs connected to the output of the clutter region detector circuit 260 and the outputs of the A/D converters 220-1 to 220-N (corresponding to the channels $CH_1$ to $CH_N$) to produce information indicative of covariance matrix $\phi$. The weighting coefficient computational circuitry further comprises a weighting coefficient computing circuit 280 having an input connected to the output of the covariance matrix computing circuit 270 to calculate an inverse matrix $\phi^{-1}$ of the covariance matrix input thereto, thus calculating a weighting coefficient vector W on the basis of the relationship expressed as $W=\mu\phi^{-1}S^*$ where $\mu$ is an arbitrary constant and $S^*$ is an arbitrary vector.

In operation, a signal coming into a radar and received by the main antenna 200-0 and the auxiliary antennas 200-1 to 200-N is transmitted to the receiver circuits 210-0 to 210-N to provide a plurality of radar video signals. The plurality of radar video signals are converted to a plurality of digital signals by analog-to-digital (A/D) converters 220-0 to 220-N, respectively. Assume now that T is referred to as a sampling interval in performing A/D conversion and $X_O(lT)$ to $X_N(l_T)$ (l=1,2 ... M) are referred to as output signals of the A/D converters, respectively. These output signals $X_O(l_T)$ to $X_N(l_T)$ are fed to the memories 230-0 to 230-N and at the same time to the covariance matrix computation circuit 270. The output $X_O(l_T)$ is fed to the clutter region detector circuit 260 so as to be used for determining a clutter region. The covariance matrix computation circuit 270 is responsive to the clutter region signal from the clutter region detector circuit 260 to calculate the covariance matrix $\phi$ from generally K digital data outside the clutter region by using the following equation:

$$\phi = \begin{pmatrix} \frac{1}{K}\Sigma X_0^*(l_T)X_0(l_T) \ldots \frac{1}{K}\Sigma X_N^*(l_T)X_0(l_T) \\ \frac{1}{K}\Sigma X_0^*(l_T)X_N(l_T) \ldots \frac{1}{K}\Sigma X_N^*(l_T)X_N(l_T) \end{pmatrix} \quad (6)$$

The weighting coefficient computation circuit 280 first effects an inverse matrix operation $\phi^{-1}$ expressed by the equation (6) and thereafter calculates weight coefficient W from the equations (2) and (3).

The multipliers 240-0 to 240-N multiply $W_O$ to $W_N$, given by the weighting coefficient computation circuit 280, by digital data $X_O(l_T)$ to $X_N(l_T)$ respectively read from the corresponding memories to calculate $W_OX_O(l_T)$ to $W_NX_N(l_T)(l=1, 2, \ldots M)$.

Finally, the adder 250 performs the following calculation to calculate an output signal $y(l_T)$.

$$y(l_T) = \sum_{i=1}^{N} W_iX_i(l_T). \quad (7)$$

In a particular case where the number of auxiliary antennas is one (N=1), as a result of the above calculations, the weight coefficient $W_1$ is expressed as below when the constant $\mu$ is selected so that $W_0$ equals 1(one).

$$W_1 = \frac{1/K \Sigma X_0^*(l_T)X_1(l_T)}{1/K \Sigma X_1^*(l_T)X_1(l_T)}$$

As readily appreciated from the foregoing description, the coherent sidelobe canceller of the foregoing embodiment is constituted as a linear array antenna system having digital open-loop configuration for sidelobe cancellation processing.

Accordingly, the sidelobe cancellation system according to this embodiment can eliminate the necessity of repetitive calculation which must be used in the prior art sidelobe canceller based on a closed-loop control, thus allowing the present system to be free from the convergence time problem.

Further, even if compared to another prior art system based on a digital open-loop control which could be considered to be closer to the present system than the first mentioned closed-loop system, there is a clear difference therebetween in that the present system is designed so as to delay a received signal by a processing time required for weighting coefficient calculation using a memory so that both timings of the received signal and the weighting coefficient are equal to each other. For this reason, with the present system, there is no possibility that a processing time delay occurs, thus making it possible to prevent interference suppression capability from being degraded.

Furthermore, the present system is provided with means for detecting a cluttter region, thereby to completely remove undesired phenomenon caused by a clutter signal which would be mixed during the execution of weighting coefficient processing, which could not avoided with both the prior art systems.

As stated above, the present invention makes it possible to calculate a theoretically optimum weight coefficient solely using a radar received signal wherein the computation time required therefor depends upon the number N of auxiliary antennas. The present invention stores received input signals in memories during a time required for weighting coefficient calculation to be performed, read out the stored signals from the memories upon completion of the weighting coefficient calculation, thereby to implement coherent sidelobe processing thereof using the calculated weighting coefficient. Accordingly, there arises no problem in respect of computational processing time. In addition to this, the theoretically optimum weight cofficient can be applied without processing delay. Further, the undesired influence of clutter can be avoided to provide an improved interference signal suppression capability.

What is claimed is:

1. A coherent sidelobe canceller configured as a linear array antenna system having a digital open-loop configuration comprising:

signal receiver means having (N+1) channels connected to a main antenna and N auxiliary antennas in a one-to-one relationship, for producing radar video signals, N being an integer;

analog-to-digital converter means having (N+1) channels, each channel being connected to a corresponding one of said signal receiver means for converting said radar video signals to digital signals;

a first calculating means connected to all (N+1) channels of said analog-to-digital converter means for calculating a covariance matrix $\phi$ based on said digital signals from said analog-to-digital converter means;

a second calculating means connected to an output of said first calculating means for calculating a weighting coefficient vector W on the basis of the relationship expressed as $W = \mu \phi^{-1} S^*$, where $\mu$ is an arbitrary constant, $\phi^{-1}$ is an inverse matrix of said covariance matrix $\phi$ and $S^*$ is an arbitrary vector, said second calculating means having a plurality of outputs for outputting the components of the vector W;

memory means having (N+1) memory cells, each of said memory cells being connected to a corresponding channel of said analog-to-digital converter means, said memory means for storing and delaying said digital signals of said analog-to-digital converter means until the calculation of said vector W is completed;

multiplier means having (N+1) multipliers, each of said multipliers having one input connected to an output of said corresponding memory cell and another input connected to one of said plurality of outputs of said second calculating means, said multiplier means for multiplying said digital signals stored in said memory cells by said weighting coefficient vector W; and summing means for summing output signals from said multiplier means to suppress interference signals based on real time processing;

whereby said memory means enables the storage and delay of said ditigal signals until completion of the calculation of said vector W in said second calculating means so as to permit optimization of the time at which said digital signals are input to said multiplier means with respect to the time of input of said weight coefficient vector to thereby adjust for optimizing interference rejection.

2. A coherent sidelobe canceller according to claim 1, wherein said second calculating means further includes clutter region detector means responsive to said digital signal obtained as an output of said analog-to-digital converter connected to said main antenna through the corresponding receiver channel to determine a clutter region in the received signal, thereby to carry out said weighting coefficient calculation utilizing digital signals outside of said clutter region.

* * * * *